(12) United States Patent
McElrath

(10) Patent No.: US 9,354,141 B1
(45) Date of Patent: May 31, 2016

(54) TURBINE LIQUID FUEL SIMULATOR

(71) Applicant: JANSEN'S AIRCRAFT SYSTEMS CONTROLS, INC., Tempe, AZ (US)

(72) Inventor: Schuyler V. McElrath, Greenville, SC (US)

(73) Assignee: JANSEN'S AIRCRAFT SYSTEMS CONTROLS, INC., Tempe, AZ (US)

( * ) Notice: Subject to any disclaimer, the term of this patent is extended or adjusted under 35 U.S.C. 154(b) by 122 days.

(21) Appl. No.: 14/307,387

(22) Filed: Jun. 17, 2014

Related U.S. Application Data

(60) Provisional application No. 61/835,794, filed on Jun. 17, 2013.

(51) Int. Cl.
*G01M 15/14* (2006.01)
*F02C 9/40* (2006.01)

(52) U.S. Cl.
CPC . *G01M 15/14* (2013.01); *F02C 9/40* (2013.01)

(58) Field of Classification Search
CPC ..... F02C 9/40; F05D 2260/80; F01D 21/003; G01M 15/14
USPC ...................................................... 73/112.01
See application file for complete search history.

(56) References Cited

U.S. PATENT DOCUMENTS

| | | | | |
|---|---|---|---|---|
| 4,206,634 A * | 6/1980 | Taylor | ............... | F02M 65/00 73/114.41 |
| 4,656,827 A * | 4/1987 | Puillet | ............... | F02C 7/22 137/599.05 |
| 6,050,081 A | 4/2000 | Jansen et al. | | |
| 6,260,426 B1 * | 7/2001 | Wharton | ............... | G01N 33/28 73/865.9 |
| 6,729,135 B1 * | 5/2004 | Norris | ............... | F02C 3/22 60/646 |
| 6,918,569 B2 | 7/2005 | Jansen | | |
| 6,931,831 B2 | 8/2005 | Jansen | | |
| 7,340,939 B2 | 3/2008 | Jansen | | |
| 7,469,712 B2 | 12/2008 | Jansen | | |
| 7,527,068 B2 | 5/2009 | Jansen | | |
| 7,721,521 B2 * | 5/2010 | Kunkle | ............... | F23C 1/08 60/39.094 |
| 7,726,951 B2 | 6/2010 | Jansen et al. | | |
| 7,730,711 B2 * | 6/2010 | Kunkle | ............... | F01D 25/007 60/39.094 |
| 7,770,400 B2 * | 8/2010 | Iasillo | ............... | F02C 7/22 60/39.281 |
| 7,874,310 B1 | 1/2011 | Jansen | | |
| 7,966,804 B2 * | 6/2011 | Snow | ............... | F01D 21/003 60/39.83 |
| 8,104,258 B1 | 1/2012 | Jansen et al. | | |
| 8,573,245 B1 | 11/2013 | Jansen | | |
| 8,650,851 B2 * | 2/2014 | Ouellet | ............... | F02C 9/40 60/39.281 |
| 8,656,698 B1 | 2/2014 | Jansen et al. | | |
| 9,207,108 B2 * | 12/2015 | Paradise | ............... | G01F 1/90 |

(Continued)

*Primary Examiner* — Freddie Kirkland, III
(74) *Attorney, Agent, or Firm* — Ingrassia Fisher & Lorenz, P.C.

(57) ABSTRACT

A turbine liquid fuel simulator exposes the components of a liquid fuel system in a turbine engine to the same fuel flows and pressures that the liquid fuel system would endure in an actual startup and run sequence, without burning or otherwise emitting the liquid fuel from the system. A fuel porting mechanism, such as a direction control valve, is installed in each combustor of the turbine engine. The fuel porting mechanism is movable from a first position, wherein liquid fuel is delivered to the combustor nozzle to be burned in normal operation, to a second position, wherein the liquid fuel is diverted to return lines that deliver the liquid fuel back to the fuel tank. To simulate the actual pressures and flows, pressure differential orifices can be installed in the return fuel lines. The orifices includes structures that modify the liquid fuel flow to mimic delivery to the nozzle.

21 Claims, 7 Drawing Sheets

(56) References Cited

U.S. PATENT DOCUMENTS

2012/0166110 A1* 6/2012 Wilson ............... B01D 46/0086 702/47

2015/0184594 A1* 7/2015 Stammen .................. F02C 9/46 60/776

* cited by examiner

TURBINE LIQUID FUEL SIMULATOR

CROSS-REFERENCE TO RELATED APPLICATIONS

This application is a non-provisional and claims the benefit of U.S. provisional application No. 61/835,794 filed on Jun. 17, 2013, the entire disclosure of which is incorporated by reference as though fully set forth herein.

STATEMENT OF FEDERALLY SPONSORED RESEARCH OR DEVELOPMENT

Not applicable.

BACKGROUND

The present disclosure relates to turbine engines, and more particularly, to a system for simulating flow through a fuel system of a turbine engine that operates on either gaseous or liquid fuel.

Turbine engines may be used to generate electrical power by burning the fuel to rotate the turbine blades. The basic principles and operation of turbine engines are generally well understood: a gas combustion engine attached to rotors of the turbine coverts the chemical energy of combusting fuel into mechanical energy to rotate the rotors, and the rotors in turn spin a magnetic around a coil of wire to induce an electrical current in attached wires. Modern power plants often use dual-fuel turbine engines, which typically use gaseous fuel, such as natural gas, as a first fuel and liquid fuel, such as liquid petroleum, as a second fuel. One or both fuels may be supplied to the engine by separate pipelines. A fuel control system segregates the first and second fuels and regulates their supply to the engine.

In a power plant, typically the dual-fuel turbine engine will operate for very long periods of time using the gas fuel as it is supplied from a natural repository. For example, natural gas may be transported from a gas mine via the pipeline directly to the turbine engine. In such applications, the liquid fuel is used only in certain infrequent situations, such as emergency, power-up, power-down, or gas fuel system maintenance situations. The liquid fuel system components may deteriorate while unused due to the cumulative effects of heat, coking, water entrainment, and corrosion. In a particular example, coke can solidify on the surfaces of pipes, valves, and seals that are in high-temperature locations and experience prolonged heating above about 250 degrees Fahrenheit.

When the liquid fuel system is activated, compromised components are likely to cause fuel delivery problems, fuel contamination, temperature variability, and ultimately damage or forced shutdown of the turbine. These problems are widely recognized and may contribute to significant losses in productivity and repair and operational costs. Turbine operators attempt to mitigate degradation and ascertain the functionality of the liquid fuel systems by periodically operating the turbine on liquid fuel through its "startup" and "run" stages to test for problems. This approach has several major drawbacks. Primarily, the turbine must be powered down and switched from gas to liquid fuel. This can cause lost productivity. Furthermore, as the turbine engine cools during power-down, components in the casing surrounding the turbine blades may heat or cool faster than each other or than the blades, distending the casing or otherwise reducing the clearance gap between the casing and the blades to the point that a blade tip impact could occur, resulting in costly damage and potential injury to workers.

In any event, the turbine is actually "fired" during the test, meaning the liquid fuel system is operated at its full capacity from fuel source to fuel combustion. If there are problems in the fuel system, the test could damage the turbine. Moreover, the firing of the liquid fuel system causes unwanted emissions. The emissions may be in the form of lost fuel, which is burned in the test even if the liquid fuel system is operating normally, or in the form of byproducts of burning the fuel. Thus, the test results in resource costs and could potentially violate emissions rules and cause fines or other penalties to be levied against the plant.

A need exists for a test environment for liquid fuel systems of dual-fuel turbine engines that does not burn the liquid fuel and does not require the turbine to be powered down for testing.

BRIEF SUMMARY

The disclosure provides a system for testing the operational condition of a liquid fuel system in a turbine engine, such as a dual-fuel turbine engine, without powering down the turbine engine, burning liquid fuel, or otherwise causing unwanted emissions.

In one aspect, the disclosure provides a turbine liquid fuel simulator for a turbine engine. The turbine liquid fuel simulator includes one or more fuel porting mechanisms, each fuel porting mechanism being in fluid communication with both a fuel tank of the turbine engine and at least one combustion nozzle of the turbine engine. The turbine liquid fuel simulator further includes a liquid fuel return line in fluid communication with each of the fuel porting mechanisms and with the fuel tank. Each fuel porting mechanism is configured to switch between a first position, wherein the fuel porting mechanism directs liquid fuel from the fuel tank to the nozzle, and a second position, wherein the fuel porting mechanism directs the liquid fuel from the fuel tank back to the fuel tank via the liquid fuel return line and prevents liquid fuel from flowing to the nozzle.

In another aspect, the disclosure provides a turbine liquid fuel simulator for testing the liquid fuel system of a turbine engine that has a fuel tank for containing liquid fuel, one or more fuel pumps for pumping the liquid fuel from the fuel tank at a first flow rate and a first fluid pressure, one or more flow dividers for receiving the liquid fuel from the one or more fuel pumps at the first flow rate and dividing the liquid fuel into a plurality of fuel flows at one or more divided flow rates, a plurality of combustors in fluid communication with the one or more flow dividers at least one nozzle for each combustor in fluid communication with the combustor, and turbine primary controls for controlling the liquid fuel system. The turbine liquid fuel simulator includes, for each combustor, a fuel porting mechanism attached to the combustor. Each fuel porting mechanism is in fluid communication with one of the flow dividers and with the nozzle of the combustor. The turbine liquid fuel simulator includes, for each fuel porting mechanism, a liquid fuel return line in fluid communication with the fuel porting mechanism and with the fuel tank. Each fuel porting mechanism is configured to switch between a first position, wherein the fuel porting mechanism directs the liquid fuel from the flow divider to the nozzle, and a second position, wherein the fuel porting mechanism directs the liquid fuel from the flow divider to the fuel tank via the liquid fuel return line and prevents liquid fuel from flowing to the nozzle.

In yet another aspect, the disclosure provides a testing system for a fuel system of a turbine engine. The testing system includes one or more fuel porting mechanisms, each fuel porting mechanism being in fluid communication with a testing media tank, a fuel tank of the turbine engine, and at least one combustion nozzle of the turbine engine. The testing system further includes a return line in fluid communication with each of the fuel porting mechanisms and with the testing media tank. Each fuel porting mechanism is configured to switch between a first position, wherein the fuel porting mechanism directs fuel from the fuel tank to the nozzle, and a second position, wherein the fuel porting mechanism directs the testing media from the testing media tank back to the testing media tank via the return line and prevents fuel from flowing to the nozzle.

These and other aspects and advantages of the disclosure will be apparent from the detailed description and drawings. What follows are one or more example embodiments. To assess the full scope of the invention the claims should be looked to, as the example embodiments are not intended as the only embodiments within the scope of the invention.

DETAILED DESCRIPTION

Figure 1:
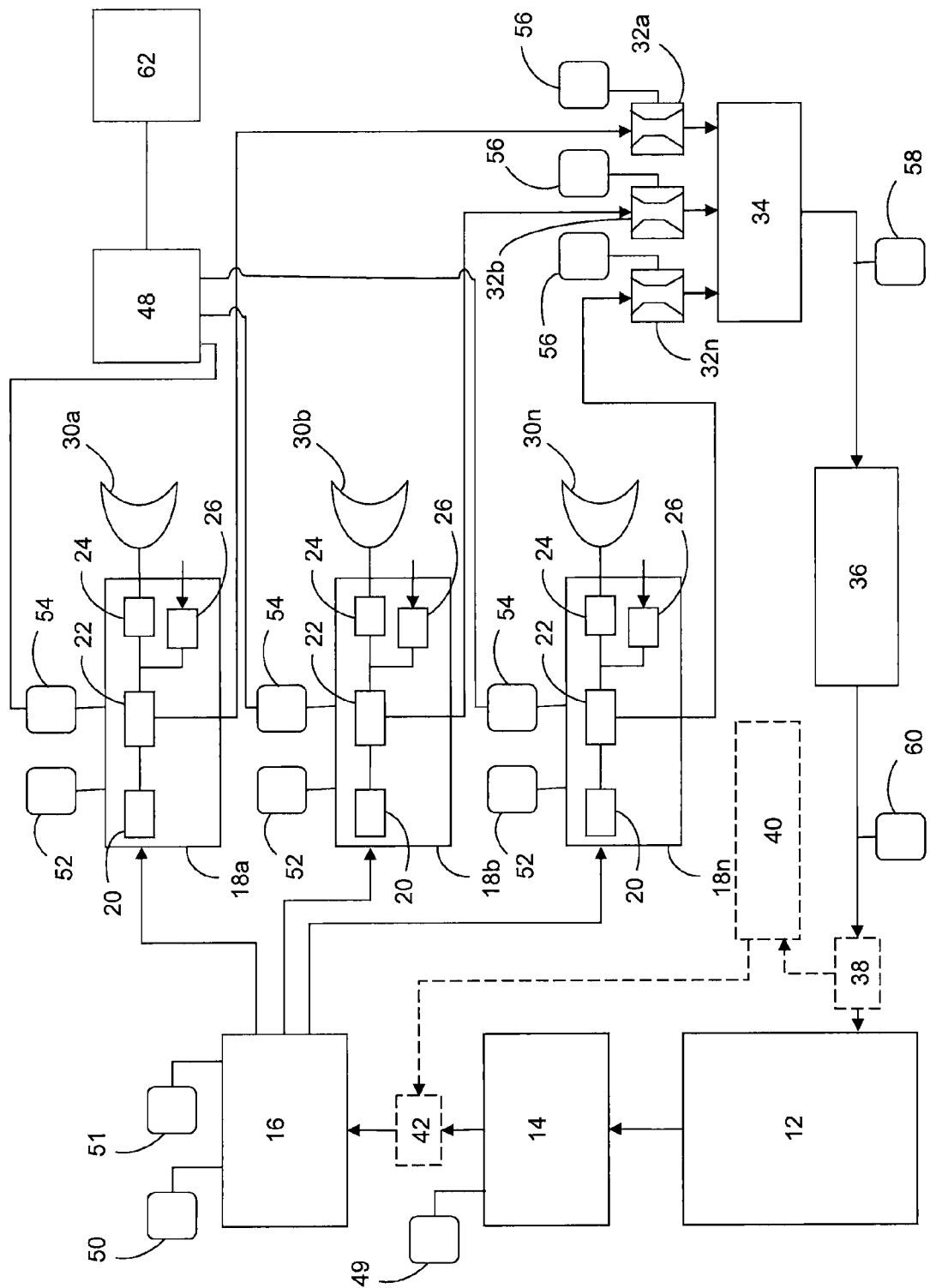
FIG. 1 is a diagram of an example system for testing a liquid fuel system of a turbine engine in accordance with the present disclosure.

The systems described herein allow operators of a turbine engine having a fuel system to operate all elements of the turbine engine and its fuel system without actually burning fuel in the engine. In this operational condition, the operator can perform zero-emission testing of the fuel system. The operator can simulate turbine start-up and other operating stages, in which all valves, pumps, servos, and other components are controlled in the same manner as they would be controlled during an actual turbine start sequence. In particular, the valves, pumps, flow dividers, etc., can be validated for operation through their most critical phases, which are light-off and acceleration during the start-up stage.

The fuel system being tested can be any fuel system of a turbine engine, such as a gaseous or liquid fuel system. While the system can be configured to test any fuel system of any turbine engine (e.g., a single-fuel gas or liquid turbine engine), the example embodiments illustrated and described herein pertain to a dual-fuel turbine engine having a gaseous fuel system and a liquid fuel system. The examples describe a turbine liquid fuel simulator installed on the liquid fuel system, but the present testing system could also or alternatively be installed on the gaseous fuel system. In dual-fuel turbines, the testing system can operate on one of the fuel systems while the other fuel system is powering the turbine. The examples further describe the turbine liquid fuel simulator operating with liquid fuel as the testing media. In other embodiments, the present testing system may be configured to use other media suitable for validating the functionality of the fuel system components, as described further below.

The turbine liquid fuel simulator (the "system") can include a fuel porting mechanism, such as a directional control valve, installed along each of the liquid fuel lines in the liquid fuel system. The directional control valves direct the liquid fuel flow to either the turbine engine combustor nozzle or to a fuel tank return line in a switchable manner. The directional control valves can provide better than ANSI Class B sealing, so that liquid fuel is not inadvertently leaked to the nozzle or the return line.

The directional control valves can be equipped with a position sensor, which can be hermetically sealed to prevent corrosion from fuel. The position sensor can provide position feedback to indicate the position of the directional control valve—that is, whether the valve is directing the fuel flow to the nozzle (herein "first position") or to the return line (herein "second position"). Feedback from each directional control valve can be routed to an electronic controller, which can be configured to function as a failsafe by only providing an output signal to the turbine primary control when all directional control valves are in the same position.

The return lines from each liquid fuel line can feed into a manifold that combines the return lines into a single fuel line. One or more orifices in the fuel lines upstream or downstream from the manifold can be equipped with a pressure differential structure that simulates the flow of liquid fuel out of the engine's fuel nozzles. The fuel line runs from the manifold to the liquid fuel tank, returning the liquid fuel that has run through the system to the tank. A check valve and a flow meter can be installed inline in the fuel line between the manifold and the fuel tank. The check valve can allow or prevent flow from the manifold to the fuel tank. The check valve can also have a hermetically sealed position sensor, such as one or more proximeter switches, to indicate the check valve position to the turbine primary control. The flow meter can generate an output signal indicating the fuel flow rate, which can be compared to a flow rate through a fuel flow divider at the head of the fuel lines to validate flow divider performance and the health of the liquid fuel system in general.

In some embodiments, the fuel systems (including the liquid fuel system and any other fuel system, such as a gas fuel system in dual-fuel turbine engines) can be equipped with water-cooled fuel controls. The water cooling allows the fuel controls to be exposed to high temperatures, such as those near the combustor cans of the fuel system, for extended periods without failure. The present systems can monitor the temperature of the water-cooled fuel controls to validate the operation of the water cooling system.

In an alternative embodiment, the testing system can circulate a different fluid or gas, rather than the fuel of the fuel system, as the testing media. The testing system can include a testing media tank that is separate from the fuel tank and stores the testing media. The testing media tank can be in fluid communication with the fuel system to be tested, upstream of the fuel system components that require validation. The return lines described above can be in fluid communication with the testing media tank. Thus, the fuel supply can be shut off, and the testing media pumped into the fuel system, circulating through the components, the fuel porting valve, and the testing media tank in the manner described above. Where the fuel systems are equipped with water-cooled fuel controls, the testing media tank may be the water tank that supplies water to the water-cooled controls, and the testing media may be water.

FIG. 1 illustrates diagrammatically an embodiment of the present system installed on a turbine engine. The system may be installed during manufacture of the turbine engine, or may be retrofit to existing turbine engines that use liquid fuel as a primary or secondary fuel in the combustion engine. A fuel tank 12 stores the liquid fuel, which is pumped out of the fuel tank 12 by one or more fuel pumps in a fuel pumping section 14. The liquid fuel is delivered to a fuel metering section 16. The fuel metering section can include one or more flow dividers that deliver the liquid fuel to individual fuel lines for each of the engine's combustion cans 18a, 18b, . . . 18n. A combustion can 18a-n can be any suitable combustor for application in a turbine engine. The total number n of combustion cans 18a-n can vary depending on the size, capacity, and performance requirements of the turbine engine. While the combustor is described herein as a can, any suitable configuration may be used, such as an annular or cannular combustor.

Each combustion can 18a-n can contain standard components for a turbine engine combustor, including a can check valve 20 for starting and stopping fuel flow through the can 18a-n, a distributor valve 24 for distributing fuel to the liquid fuel nozzle 30a, 30b, . . . 30n associated with the can 18a-n, and a purge air valve 26 for drawing air under pressure through the fuel line to purge any fuel therein. Each combustion can 18a-n can further include a fuel porting mechanism, such as a directional control valve (DCV) 22, disposed in the fuel line between the check valve 20 and the distributor valve 24. The DCV 22 can be placed in a first position and a second position. In the first position, the DCV 22 allows the liquid fuel to flow into the distributor valve 24. In the second position, the DCV 22 diverts the liquid fuel to a return line that passes out of the combustion can 18a-n to a manifold 34 without being burned or otherwise emitted out of the system. The manifold 34 can be any suitable manifold having inputs for receiving the return fuel lines of the cans 18a-n and combining the fuel flow therefrom into a main return line attached to an output of the manifold 34.

A pressure differential orifice 32a, 32b, . . . 32n may be installed inline in the fuel return line of each can 18a-n. The orifice 32a-n can include a structure for creating a bottleneck in the fuel flow in each return line. For example, the orifice 32a-n can include any suitably sized orifice plate or restriction plate that uses a varying diameter fluid passage to increase the velocity of the fluid flow, decreasing the fluid pressure. The decrease of fluid pressure simulates the fluid pressure changes that would occur in the fuel line if the fuel were delivered through the distributor valve 24 to the fuel nozzle 30a-n to be burned. In an alternative embodiment, shown in FIG. 2, a single orifice 32 can be installed inline in the main return line downstream from the manifold 34. The single orifice 32 can replace the multiple orifices 32a-n of FIG. 1 to simulate the pressure differential. The single orifice design may advantageously save materials and installation costs as compared to the multiple orifice design, but may less accurately simulate the pressure changes in the fuel lines.

Downstream of the manifold 34, a return check valve 36 may be installed in the main return line to start or stop the flow of fuel through the line. The return check valve 36 may be any suitable fuel line check valve, and may be operated by a pneumatic pilot. When the return check valve 36 is open, the liquid fuel can flow through the valve 36 and down the main return line, returning to the fuel tank 12. In embodiments where the turbine engine includes an inerting system 40, a corresponding input port 38 may be installed in the main return line upstream of the fuel tank 12, and an output port 42 may be installed in the main fuel line downstream of the fuel pumping section 14.

Figure 2:
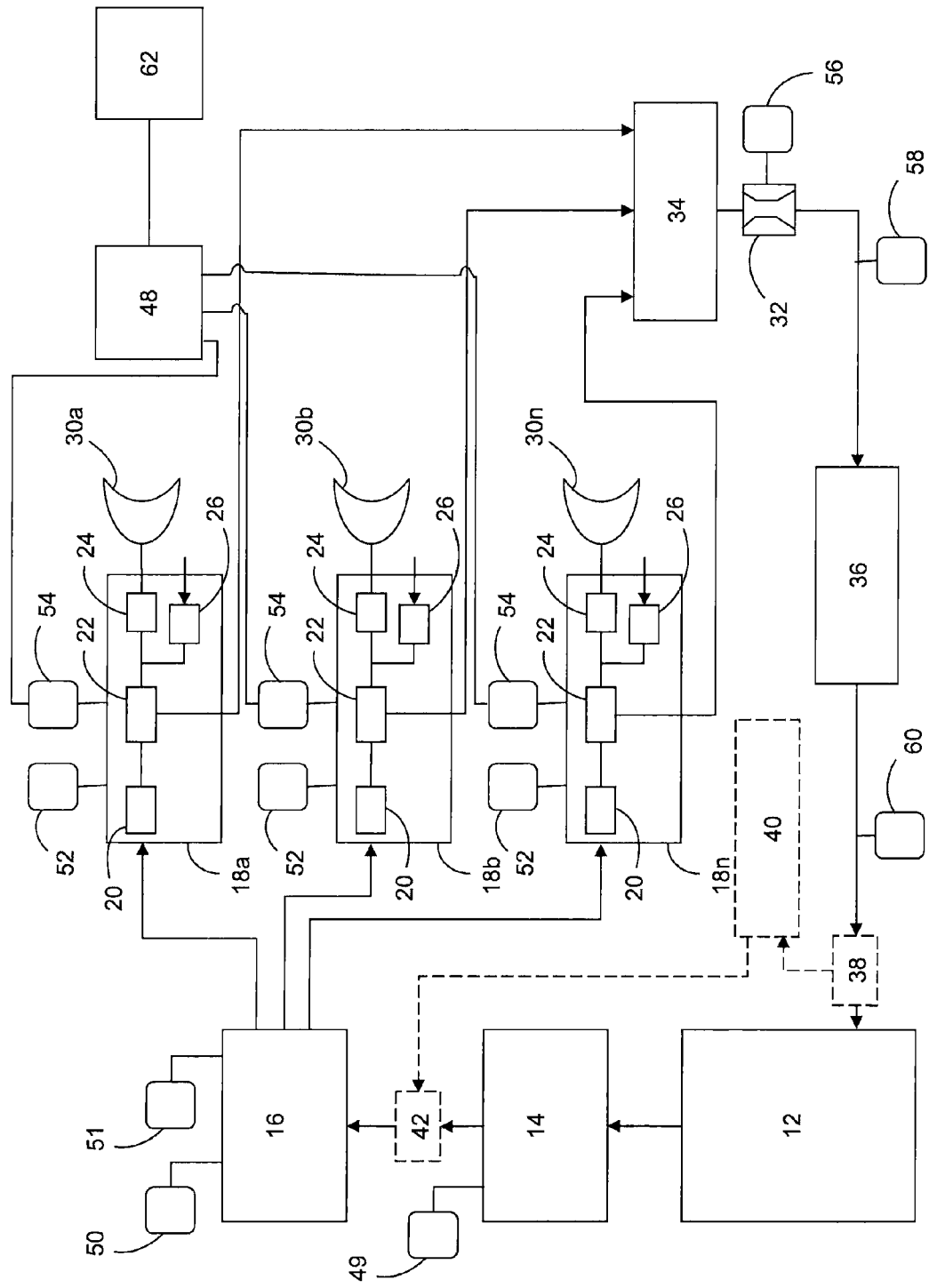
FIG. 2 is a diagram of another example system for testing a liquid fuel system of a turbine engine in accordance with the present disclosure.
Figure 3:
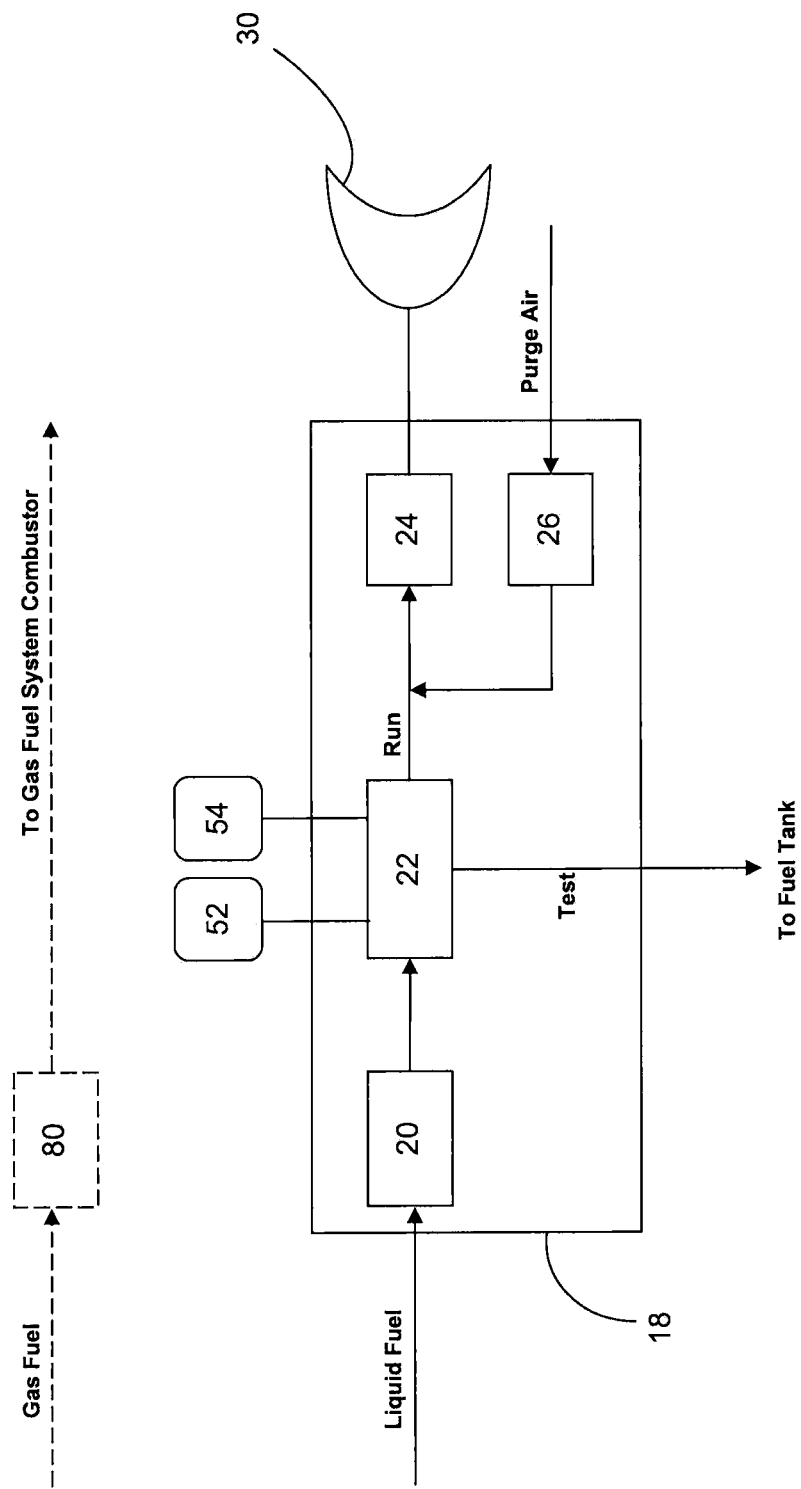
FIG. 3 is a diagram of an example combustion can of a turbine engine.

FIG. 3 illustrates further details of a combustion can 18 in accordance with the systems of FIGS. 1 and 2. Liquid fuel enters the can 18 from the metering section 16 and, if the can check valve 20 is open, passes into the DCV 22. If the turbine engine is operating on liquid fuel (i.e., the liquid fuel system is in "run" mode), the DCV 22 is in the first position and the liquid fuel is delivered to the distributor valve 24 and then to the can's 18 nozzle 30. If the liquid fuel system is operating in "test" mode, the DCV 22 is in the second position and the liquid fuel is prevented from entering the distributor valve 24, and is redirected to the can's 18 return fuel line which leads, ultimately, back to the fuel tank 12. In embodiments where the present system is installed on a dual fuel turbine engine, the gas fuel line may intersect the liquid fuel line in the can 18 downstream of the DCV 22. This allows the liquid fuel system to operate in "test" mode while the turbine engine is operating on gas fuel. A gas check valve 80 may start or stop the flow of gas fuel into the distributor valve 24. The purge air valve 26 is in fluid communication with the fuel line between the DCV 22 and the distributor valve 24, and can draw pressurized purge air through the fuel line when the fuel line needs to be purged (e.g., the liquid fuel system is shut down or the turbine engine switches to gas fuel).

Figure 4:
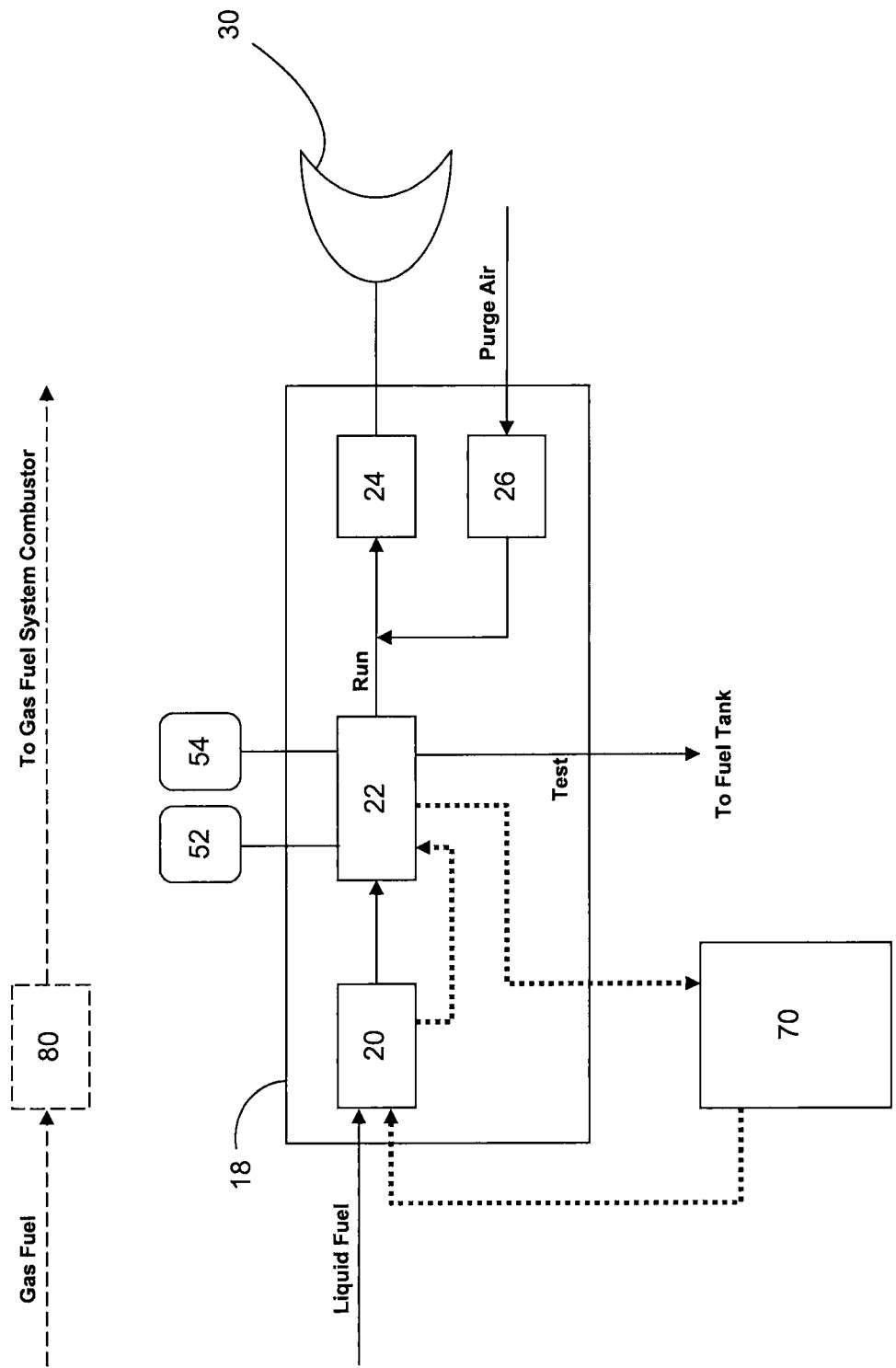
FIG. 4 is a diagram of another example combustion can of a turbine engine.

Suitable components to perform the functions described above are produced by Jansen's Aircraft Systems Controls, Inc. (JASC), and described in U.S. Pat. No. 6,050,081 (as any check valve or air purge valve), U.S. Pat. No. 6,918,569 (as a distributor valve or other fuel metering valve), U.S. Pat. No. 6,931,831 (as a distributor valve), U.S. Pat. No. 7,340,939 (for emissions analysis), U.S. Pat. No. 7,469,712 (as a pressure relief valve), U.S. Pat. No. 7,726,951 (as a flow divider), and U.S. Pat. No. 8,573,245 (as a manifold), all of which are incorporated herein by reference. As described above, the valves and other components of the liquid fuel system can be exposed to very high temperatures for extended periods of time, even when the liquid fuel system is not operating, due to the proximity of the components to thermal energy sources. High temperatures accelerate the degradation of the components and can cause coking and other flow-inhibiting and contamination problems. To combat the effects of high temperatures, one or more of the described components can be water cooled. Suitable water-cooled fuel system components and water cooling system controllers are produced by JASC and described in U.S. Pat. No. 7,527,068 (as a check valve, an air purge valve, a distributor valve, etc.), U.S. Pat. No. 7,874,310 (as a check valve, an air purge valve, a distributor valve, etc.), U.S. Pat. No. 8,104,258 (as a metering valve or purge valve), and U.S. Pat. No. 8,656,698 (as a cooling system), all of which are incorporated herein by reference. FIG. 4 illustrates an embodiment of the can 18 of FIG. 3 where some water-cooled components are used. Specifically, the can check valve 20 and DCV 22 are water-cooled and are connected by water circulation lines to a cooling system controller 70. The dotted lines indicate the coolant path: the controller 70 supplies coolant to the can check valve 20, which is circulated to the DCV 22 and then returns to the controller 70. Other components may be water-cooled as well, and may be connected in series or in parallel with the can check valve 20 and DCV 22 to the controller 70.

Figure 5:
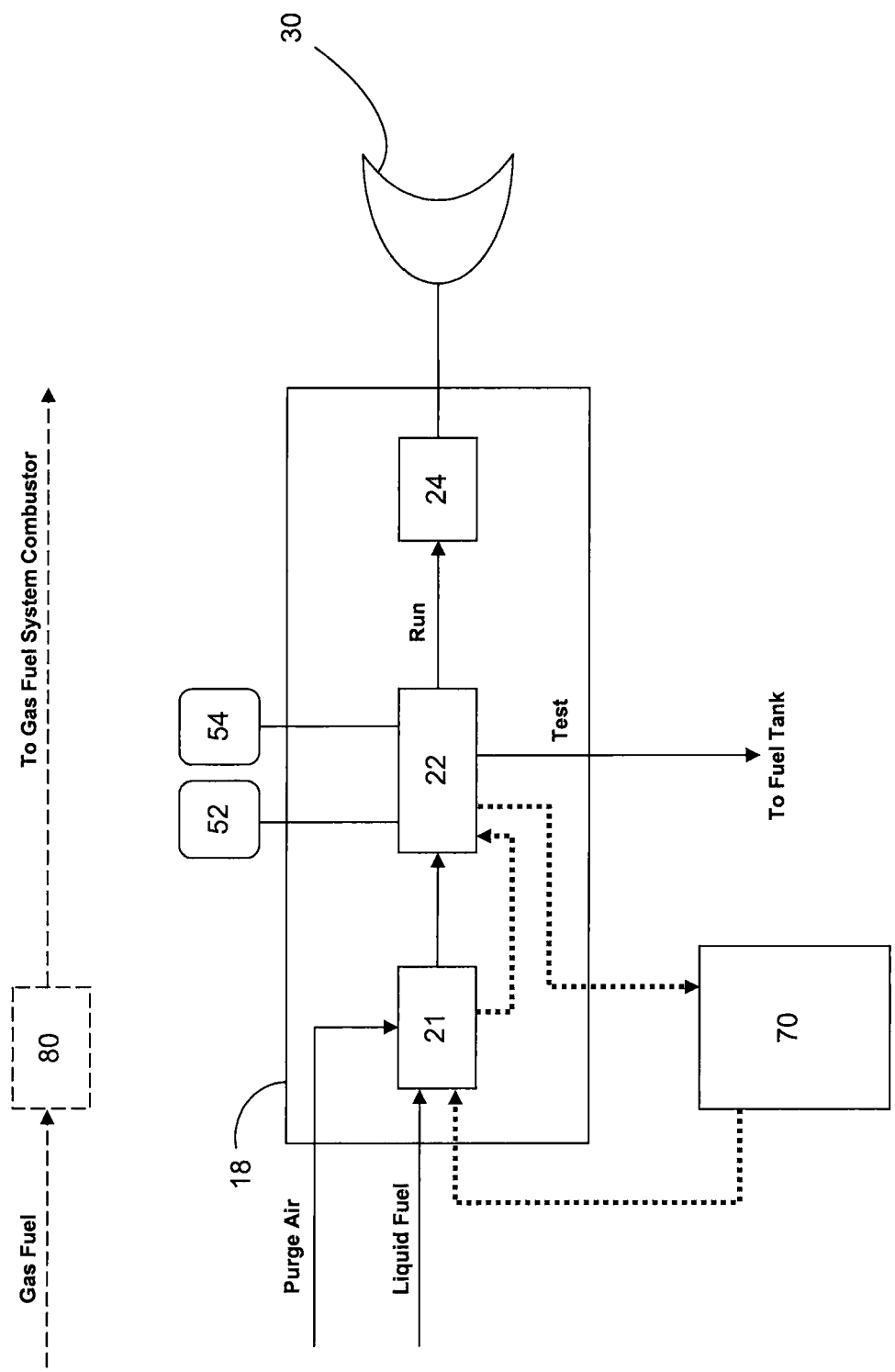
FIG. 5 is a diagram of still another example combustion can of a turbine engine.

FIG. 5 illustrates an alternative embodiment of the liquid fuel combustion can 18. In this embodiment, a three-way purge valve 21 can be used in place of the liquid fuel check valve 20 and purge air check valve 26 of the previously described embodiments. The three-way purge valve 21 can be any suitable valve (including liquid-cooled valves as illustrated) with at least two inputs and one output (for example, the purge valves described in U.S. Pat. Nos. 6,050,081 and 7,527,068). As in the fluid communication specifications described above, the liquid fuel line can be connected to a first input of the three-way purge valve 21, and the purge air line can be connected to the second input thereof. The outlet of the three-way purge valve 21 can be in fluid communication with the input of the DCV 22. In the normal position, the three-way purge valve 21 may allow purge air to pass through into the DCV 22 (thus, this is the "air" position of the three-way purge valve). The three-way purge valve 21 may then be actuated into the "fuel" position, in which liquid fuel flows through the three-way purge valve 21 into the DCV 22. With the DCV 22 in "run" mode, either purge air or liquid fuel flows through to the distributor valve 24 and nozzle 30, depending on the position of the three-way purge valve 21. With the DCV 22 in "test" mode, the three-way purge valve 21 should be in the "fuel" position to allow liquid fuel to circulate through the system as described above. A turbine engine with multiple fuel systems should be powered down before this embodiment of the simulator is operated in "test" mode, because purge air will be prevented from reaching the distributor valve 24 and nozzle 30, potentially cause damaging temperatures and coking.

Figure 6:
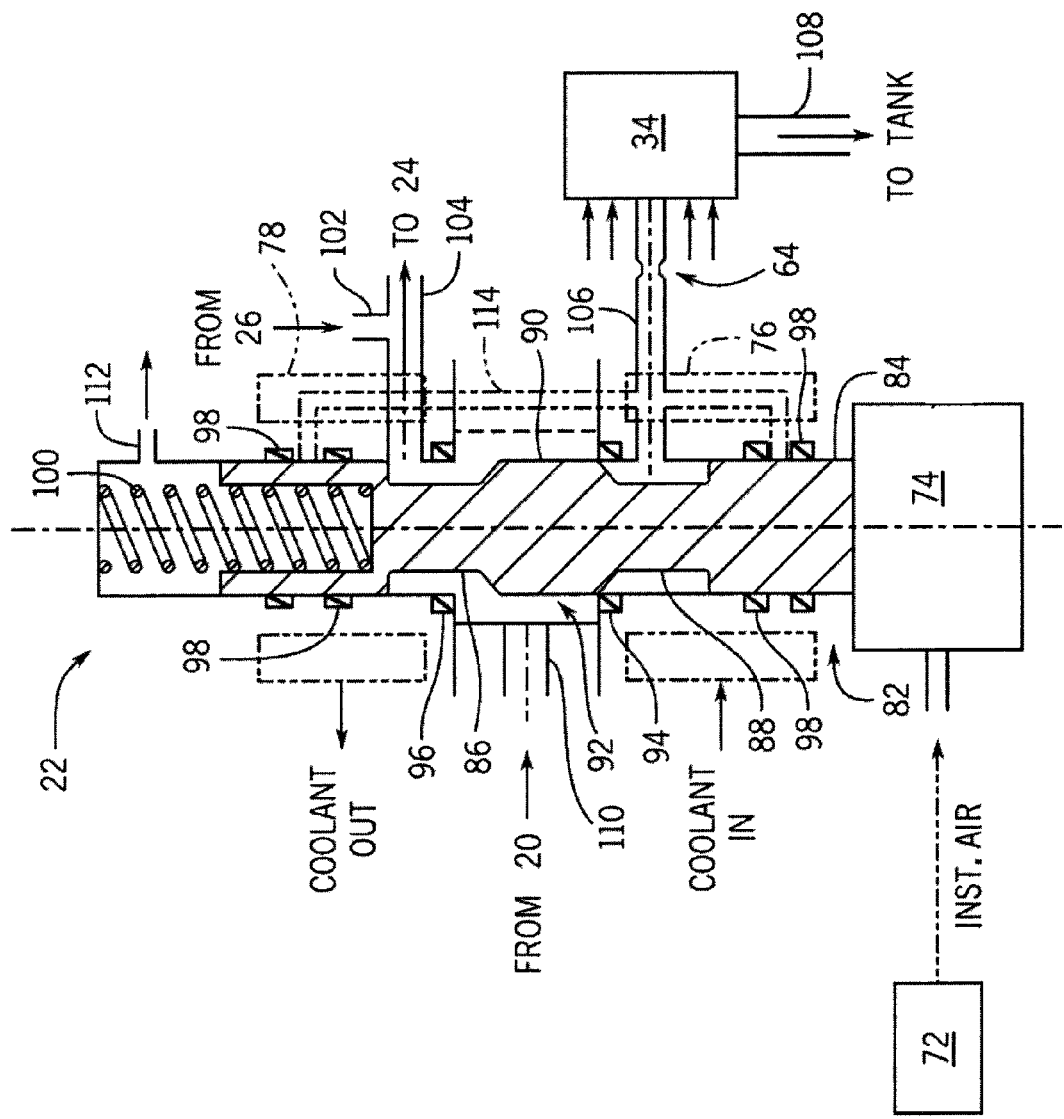
FIG. 6 is a section view of an example directional control valve that may be incorporated into the testing system in accordance with the present disclosure.

FIG. 6 illustrates an example embodiment of a water-cooled three-way DCV 22. A housing 82 houses a cylindrical spool 84 in a bore having a diameter approximately equal to the diameter of the spool 84, such that the spool 84 can move along its axis from a first position, which corresponds to the first position of the DCV 22, to a second position, which corresponds to the second position of the DCV 22, but cannot move in any other direction. A spring 100 within a spring chamber 116 biases the spool 84 to its first position. The spring chamber 116 may be vented (i.e., by a vent 112) to allow air to escape when the spool 84 compresses the spring 100 and the spring chamber 116. The DCV 22 can be pneumatically operated by a remote pilot valve 72, which may be a solenoid valve that delivers pressurized air to a switch cavity 74 to actuate the DCV 22 to its second position. In the example embodiment, the portion of the valve that contacts the liquid fuel is sealed with redundant o-rings 98 disposed near both ends of the spool 84, but other structures for forming static or dynamic seals between the spool 84 and housing 82 may be used.

The spool 84 can include a first groove 86 separated from a second groove 88 by a wide-diameter land 90 that is wider than the ends of the spool 84. The portion of the bore approximate the land 90 can be wider than the land 90, creating a fuel chamber 92 around the land 90. The fuel chamber 92 is in fluid communication with an inlet line 110 that receives liquid fuel, e.g., from the can check valve 20. When the DCV 22 is in the first position, the fuel chamber 92 is in fluid communication with the first groove 86, providing a fuel flow path from the inlet line 110 to a combustion line 104. The combustion line 104 is in turn connected to the distributor valve 24. A purge air line 102 from the purge air valve 26 may intersect the combustion line 104 as shown. When the DCV 22 is in the second position, the fuel chamber 92 is in fluid communication with the second groove 88, providing a fuel flow path from the inlet line 110 to a return line 106. The return line 106 is in turn connected to the manifold 34 and may include a pressure differential orifice 64 (equivalent to the can-specific orifices 32*a-n* described above). The manifold 34 converges the fuel flows from the return line 106 of each can 18 into the main return line 108 as described above.

In the first position, the land 90 of the spool 84 can seal against a first seat 94 retained in the housing 82, segregating the second groove 88 from the fuel chamber 92. In the second position, the land 90 can seal against a second seat 96 retained in the housing 82, segregating the first groove 86 from the fuel chamber 92. The seats 94, 96 may be any suitable resilient material that is corrosion resistant in the presence of turbine fuels, such as a partially deformable polymer. Exemplary suitable polymers include thermoplastics such as polytetrafluoroethylene and polychlorotrifluoroethylene. Due to sealing of the land 90 against the second seat 96, liquid fuel is prevented from entering the combustion line 104 when the liquid fuel system is in "test" mode. Furthermore, liquid fuel is prevented from entering the return line 106 when the liquid fuel system is in "run" mode, provided there are no leaks in the DCV 22. An interstitial vent 114 may open into the bore of the housing 82 between the redundant o-rings 98 at either end of the spool 84 and connect to the return line 106.

The DCV 22 can be water-cooled as described above. In the illustrated example, a coolant inlet chamber 76 and a coolant outlet chamber 78 are disposed in the housing approximate and encircling each end of the spool 84. The coolant chambers 76, 78 can be connected by one or more coolant channels (not shown) to facilitate circulation of the coolant (e.g., water) from the coolant inlet chamber 76 to the coolant outlet chamber 78. The illustrated DCV 22 includes one example of a suitable water-cooling system, and other systems may be used.

The described system creates an operational scenario that utilizes components of the existing (for retrofitted turbine engines) or standard fuel metering and delivery system to mimic an actual startup and run sequence. With the DCV 22 of each can 18*a-n* in the first position and the return check valve 36 closed, the liquid fuel system can be activated and power the turbine engine as normal—that is, the liquid fuel is delivered through the cans 18*a-n* to the liquid fuel nozzles 30*a-n* and burned under normal operating conditions. The liquid fuel system can be tested by switching each DCV 22 to the second position and opening the return check valve 36. In this position, the liquid fuel system will create and be exposed to the same media, pressure, and flows as an operating system, and the liquid fuel will be returned to the fuel tank 12 with zero emissions.

FIGS. 1-4 further illustrate a control and monitoring framework for the liquid fuel system. Any of the valves, pumps, and other components can be actuated by control signals sent from the turbine engine primary controls 62. Parameters of the liquid fuel system can be monitored at various points in the system via feedback from one or more sensors configured to read the parameter from a component of the system and transmit the read value to a data acquisition system (DAS) (not shown), which may be embodied on a local or remote computer. The control signals and sensor signals can be transmitted from origination to destination in any suitable protocol over any suitable analog or digital network, in wired, wireless, or combination wired/wireless environments. These electrical connections are not illustrated to preserve clarity of the diagrams.

Non-limiting examples of system parameters that can be monitored by sensors include: component temperature, monitored by a temperature sensor; component status, monitored by a suitable sensor for the component; fluid pressure, monitored by a pressure transducer; and fluid flow rate, monitored by a flow meter. A component status and its associated sensor may depend on the type of component being monitored. For example, a status of a valve or switch may indicate the position thereof, and a suitable sensor may be a proximeter switch or a linear variable displacement transducer. Any suitable sensor capable of detecting the desired parameter may be used. Any or all sensors may be equipped with a transmitter configured to transmit detected values according to the network configuration. Any or all sensors may be configured only to detect and transmit the detected values, or the sensors may be equipped with sufficient processing power to perform various tasks, such as store detected values in memory or compare detected values to stored threshold values as described below. The illustrated example system includes sensors that monitor all four of these example parameters at various points in the system.

A pump pressure sensor 49 can detect the fluid pressure of pumps in the pumping section 14. Similarly, a flow divider pressure sensor 50 can detect the fluid pressure of the flow dividers in the metering section 16. The detected pressures can be reported to the DAS and can be compared to known baseline values to confirm the pumps are working properly. A flow rate sensor 51 can detect the fuel flow rates through the fuel lines as they exit the metering section 16, and can transmit the detected flows to the DAS. These flow rates can also be compared to known baseline rates, and can be combined to determine the total flow rate through the metering section 16.

Each can 18*a-n* can include one or both of a temperature sensor 52 and a status sensor 54 configured to monitor the DCV 22. The temperature sensor 52 transmits the temperature of the DCV 22 to the DAS. The temperature can be monitored for abnormally high or spiking readings, which may indicate a problem. Where the DCV 22 is water-cooled, the temperature can be monitored to validate that the water cooling system is functioning. The status sensor 54 can detect the position of the DCV 22—that is, whether the DCV 22 is in the first position or second position. The status sensor 54 can report the detected position to an electronic controller 48. The controller 48 can function as a failsafe, as described above, by receiving and comparing the detected position of all of the DCVs 22 in the system. If the DCVs 22 are all in the same (i.e., first or second) position, the system is functioning normally and the controller 48 outputs a "normal" signal to the primary controls 62 and/or DAS. If the DCVs 22 are not all in the same position, the system is in a failure condition and the liquid fuel system should not be used. The controller detects this condition and sends a "fail" signal or terminates its "normal" signal to the primary controls 62. In some embodiments, the protection provided by the controller 48 can be improved through redundancy of the received signals from the status sensors 54. For example, the controller 48 can include three independent processors that each receive the signal from each status sensor 54. Each processor can then transmit the controller's 48 signal to a corresponding independent processor at the primary controls 62. At least two of the signals at the primary controls 62 processors must match before a command is executed.

Along the main return line 108, a pressure differential sensor 56 can monitor the pressure drop across each orifice 32*a-n* (or orifice 32 in the single-orifice embodiment) and report the measured pressure drop to the DAS. The flow rate, which in normal conditions is equivalent to the pressure drop across the distributor valve 24 and nozzle 30 of each can 18, can be calculated from the detected pressure drop. A downstream pressure sensor 58 and a flow sensor 60 can detect the fluid pressure and flow rate, respectively, in the main return line downstream from the manifold 34 and report the measured values to the DAS. The flow rate in the main return line can be compared to the calculated total flow rate through the metering section 16. The flow rates will be equal if the system is operating normally; a flow difference indicates a problem in the liquid fuel system.

Figure 7:
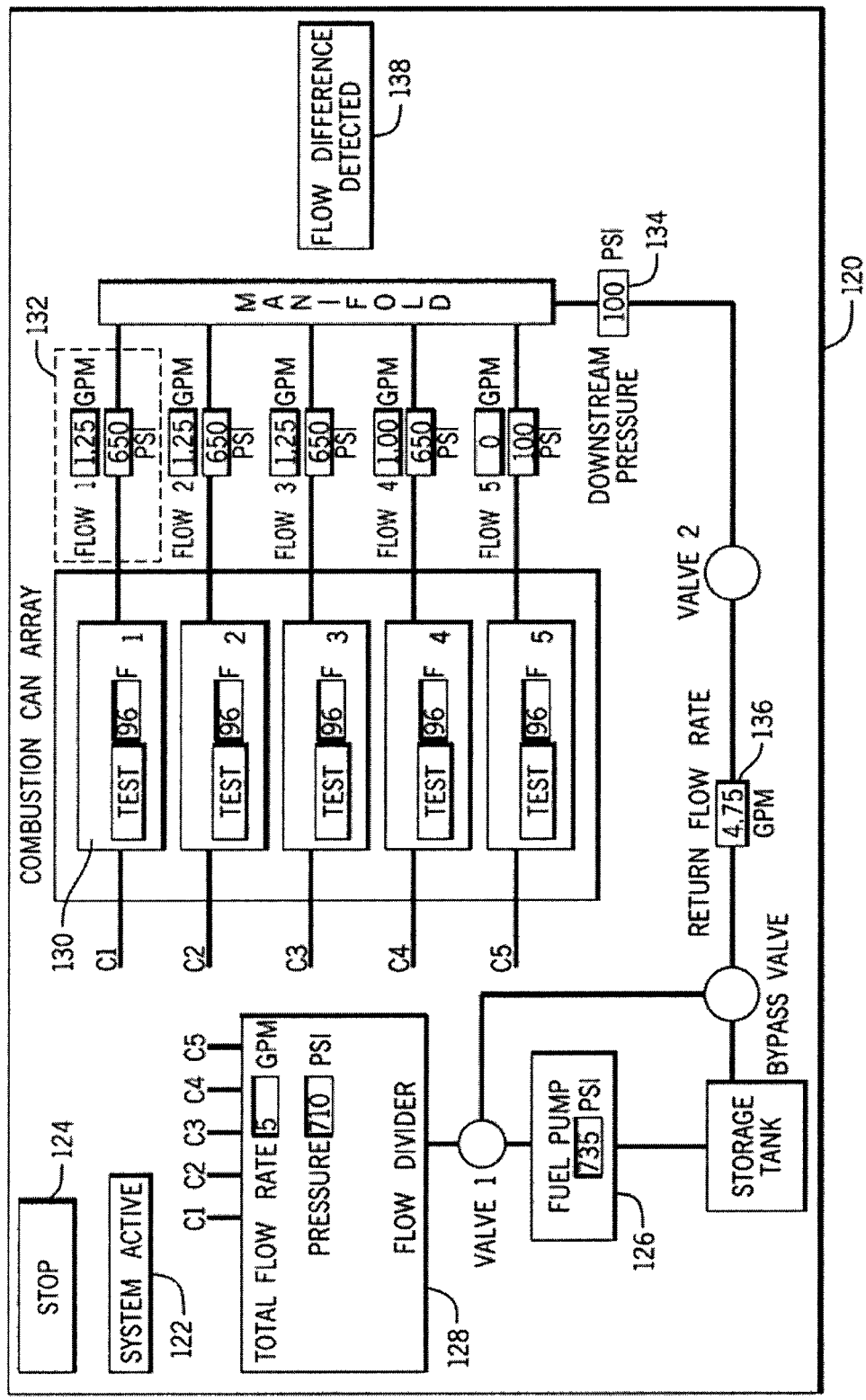
FIG. 7 is a diagram of an example user interface for the testing system in accordance with the present disclosure.

Referring to FIG. 7, a DAS interface 120 may be provided to convey the parameters of the monitored system components to a user. The interface 120 may be configured to access the DAS to retrieve the data transmitted to the DAS by the sensors, as well as any data calculated from the detected values. The interface 120 may graphically display a system representation to the user, including any or all of the monitored components and any or all of the non-monitored components. The illustration of the interface 120 in FIG. 7 is taken during a test of the liquid fuel system, which may be indicated by a "system active" icon 122 on the display. Readouts for the system fuel pump, flow divider, combustion cans, orifices, and main return line each display the values detected or calculated for the parameters monitored by the sensors. Specifically, in the illustrated example: a fuel pump readout 126 displays the fuel pump pressure; a flow divider readout 128 displays the total flow rate and pressure either measured at the flow divider inlet or calculated from the flow divider outlets; can readouts (e.g., can readout 130) for each can in the combustion can array display the position (e.g., "TEST" when the DCV is in the second position) and temperature of the DCV; orifice readouts (e.g., orifice readout 132) display the flow rate and pressure calculated from the detected pressure drop through the orifice; main return pressure readout 134 displays the fluid pressure downstream of the manifold; and return flow rate readout 136 displays the flow rate in the main return line.

Alerts to failure conditions can be displayed in the interface 120. For example, the return flow rate in the main return line does not match the total flow rate through the flow divider, so a flow difference indicator 138 is displayed. The interface 120 can also receive input from a user and control the system based on the input. For example, the user can stop the test by pressing the STOP button 124. In addition, the DAS can record the measured parameters over time to develop data logs and performance analysis and trends.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the any use of terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

It should be appreciated that merely example embodiments of the have been described above. However, many modifications and variations to the example embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A turbine liquid fuel simulator for a turbine engine, comprising:
   one or more fuel porting mechanisms, each fuel porting mechanism being:
      in fluid communication with a fuel tank of the turbine engine; and
      in fluid communication with at least one combustion nozzle of the turbine engine; and
   a liquid fuel return line in fluid communication with each of the fuel porting mechanisms and with the fuel tank;
   wherein each fuel porting mechanism is configured to switch between:
      a first position, wherein the fuel porting mechanism directs liquid fuel from the fuel tank to the nozzle, and a second position, wherein the fuel porting mechanism directs the liquid fuel from the fuel tank back to the fuel tank via the liquid fuel return line and prevents liquid fuel from flowing to the nozzle.

2. The turbine liquid fuel simulator of claim 1, wherein each of the fuel porting mechanisms is a directional control valve.

3. The turbine liquid fuel simulator of claim 1, wherein the turbine engine includes a plurality of combustors, and one of the fuel porting mechanisms is attached to each of the combustors.

4. The turbine liquid fuel simulator of claim 3, further comprising a manifold, wherein the liquid fuel return line comprises:
 a plurality of combustor return lines, each combustor return line in fluid communication with the fuel porting mechanism of one of the combustors and with an input of the manifold; and
 a main return line in fluid communication with an output of the manifold and with the fuel tank, such that liquid fuel that flows in each of the combustor return lines combines in the manifold and flows through the output into the main return line.

5. The turbine liquid fuel simulator of claim 4, further comprising:
 an orifice disposed in the main return line; and
 a pressure differential structure that modifies fluid pressure of the liquid fuel flow in the main return line to simulate a pressure drop that would occur if the liquid fuel were delivered to the nozzle.

6. The turbine liquid fuel simulator of claim 4, further comprising:
 a plurality of orifices, each orifice disposed in one of the combustor return lines; and
 a pressure differential structure that modifies fluid pressure of the liquid fuel flow in the combustor return line.

7. The turbine liquid fuel simulator of claim 6, wherein the fluid pressure of the liquid fuel flow in the combustor return line is modified by the orifice to simulate a pressure drop that would occur if the liquid fuel were delivered to the nozzle.

8. The turbine liquid fuel simulator of claim 7, further comprising, for each orifice, an orifice pressure sensor positioned to measure the fluid pressure of the liquid fuel flow across the orifice.

9. The turbine liquid fuel simulator of claim 8, wherein each orifice pressure sensor includes a transmitter configured to transmit the measured fluid pressure to a data acquisition system.

10. The turbine liquid fuel simulator of claim 9, wherein the data acquisition system calculates the liquid fuel flow rate through each combustor from the measured fluid pressure transmitted from each orifice pressure sensor.

11. The turbine liquid fuel simulator of claim 3, wherein the turbine engine includes one or more flow dividers disposed in fluid communication between the fuel tank and the fuel porting mechanisms and configured to receive the liquid fuel from the fuel tank at a first flow rate and deliver the liquid fuel to the fuel porting mechanisms at one or more divided flow rates each lower than the first flow rate, the turbine liquid fuel simulator further comprising:
 a first flow sensor positioned to measure the first flow rate at the flow dividers, the first flow sensor having a transmitter configured to transmit the measured first flow rate to a data acquisition system; and
 a second flow sensor positioned to measure a return flow rate of the liquid fuel in the liquid fuel return line, the second flow sensor having a transmitter configured to transmit the measured return flow rate to the data acquisition system.

12. The turbine liquid fuel simulator of claim 11, wherein the data acquisition system is configured to alert a user of a failure condition if the measured first flow rate and the measured return flow rate are not equal.

13. The turbine liquid fuel simulator of claim 1, further comprising, for each fuel porting mechanism, a position sensor positioned to detect whether the fuel porting mechanism is in the first position or the second position.

14. The turbine liquid fuel simulator of claim 13, wherein each position sensor is configured to transmit the detected position to a controller that compares the detected position of each fuel porting mechanism and transmits a signal if all of the detected positions are the same, and stops transmitting the signal if all of the detected positions are not the same.

15. The turbine liquid fuel simulator of claim 1, wherein each of the fuel porting mechanisms is water-cooled, the turbine liquid fuel simulator further comprising, for each fuel porting mechanism, a temperature sensor positioned to measure the temperature of the fuel porting mechanism and configured to transmit the measured temperature to a data acquisition system.

16. In a turbine engine having a liquid fuel system including:
 a fuel tank for containing liquid fuel;
 one or more fuel pumps for pumping the liquid fuel from the fuel tank at a first flow rate and a first fluid pressure;
 one or more flow dividers for receiving the liquid fuel from the one or more fuel pumps at the first flow rate and dividing the liquid fuel into a plurality of fuel flows at one or more divided flow rates;
 a plurality of combustors in fluid communication with the one or more flow dividers;
 for each combustor, at least one nozzle in fluid communication with the combustor; and
 turbine primary controls for controlling the liquid fuel system;
a turbine liquid fuel simulator for testing the liquid fuel system, comprising:
 for each combustor, a fuel porting mechanism attached to the combustor, each fuel porting mechanism being in fluid communication with one of the flow dividers and with the nozzle of the combustor; and
 for each fuel porting mechanism, a liquid fuel return line in fluid communication with the fuel porting mechanism and with the fuel tank;
 wherein each fuel porting mechanism is configured to switch between:
  a first position, wherein the fuel porting mechanism directs the liquid fuel from the flow divider to the nozzle, and
  a second position, wherein the fuel porting mechanism directs the liquid fuel from the flow divider to the fuel tank via the liquid fuel return line and prevents liquid fuel from flowing to the nozzle.

17. The turbine liquid fuel simulator of claim 16, wherein the turbine primary controls are configured to place the liquid fuel system in:
 a "run" mode, wherein the fuel porting mechanisms are moved to the first position and the liquid fuel is delivered from the fuel tank to the nozzle and burned; and
 a "test" mode, wherein the fuel porting mechanisms are moved to the second position and the liquid fuel is pumped from the fuel tank and returned to the fuel tank via the liquid fuel return lines without being emitted from the liquid fuel system, the "test" mode exposing the liquid fuel system to the same liquid fuel, fluid pressures, and liquid fuel flows as the "run" mode.

18. The turbine liquid fuel simulator of claim 16, further comprising:
for each liquid fuel return line, an orifice disposed in the liquid fuel return line, the orifice including a pressure differential structure that modifies fluid pressure of the liquid fuel flow in the liquid fuel return line to simulate a pressure drop that would occur if the liquid fuel were delivered to the nozzle of each combustor.

19. The turbine liquid fuel simulator of claim 18, further comprising:
a manifold having a plurality of inputs and at least one output, each liquid fuel return line being in fluid communication with an input of the manifold, and the manifold being configured to combine liquid fuel flows from the liquid fuel return lines and deliver a combined flow to each output; and
a main return line in fluid communication with an output of the manifold and with the fuel tank.

20. The turbine liquid fuel simulator of claim 19, further comprising:
a first pressure sensor positioned to measure fluid pressure of the liquid fuel at the one or more fuel pumps;
a second pressure sensor positioned to measure fluid pressure of the liquid fuel at the one or more flow dividers;
a first flow rate sensor positioned to measure the first flow rate at the one or more flow dividers;
for each fuel porting mechanism:
a position sensor positioned to detect whether the fuel porting mechanism is in the first position or the second position;
a temperature sensor positioned to measure the temperature of the fuel porting mechanism;
for each orifice, an orifice pressure sensor positioned to measure fluid pressure of the liquid fuel flow across the orifice;
a third pressure sensor positioned to measure fluid pressure of the main return line;
a second flow rate sensor positioned to measure a return flow rate of the liquid fuel in the main return line; and
a data acquisition system configured to:
receive parameters comprising one or more of the measured fuel pressure from the first pressure sensor, the measure fuel pressure from the second pressure sensor, the measured first flow rate from the first flow rate sensor, the detected position of each fuel porting mechanism from the position sensors, the measured temperature from each of the temperature sensors, the measured fluid pressure from each of the orifice pressure sensors, the measured fluid pressure from the third pressure sensor, and the measured return flow rate from the second flow rate sensor; and
display an interface to a user, the interface including one or more of the parameters.

21. A testing system for a fuel system of a turbine engine, the testing system comprising:
one or more fuel porting mechanisms, each fuel porting mechanism being:
in fluid communication with a testing media tank;
in fluid communication with a fuel tank of the turbine engine; and
in fluid communication with at least one combustion nozzle of the turbine engine; and
a return line in fluid communication with each of the fuel porting mechanisms and with the testing media tank;
wherein each fuel porting mechanism is configured to switch between:
a first position, wherein the fuel porting mechanism directs fuel from the fuel tank to the nozzle, and
a second position, wherein the fuel porting mechanism directs the testing media from the testing media tank back to the testing media tank via the return line and prevents fuel from flowing to the nozzle.

* * * * *